United States Patent
Heo et al.

(10) Patent No.: US 6,870,308 B2
(45) Date of Patent: Mar. 22, 2005

(54) ELECTRON AMPLIFIER UTILIZING CARBON NANOTUBES AND METHOD OF MANUFACTURING THE SAME

(75) Inventors: Jung-na Heo, Seoul (KR); Whi-kun Yi, Kyungki-do (KR); Jeong-hee Lee, Kyungki-do (KR); Se-gi Yu, Kyungki-do (KR); Tae-won Jeong, Seoul (KR); Chang-soo Lee, Kyungki-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 10/368,466

(22) Filed: Feb. 20, 2003

(65) Prior Publication Data

US 2003/0173884 A1 Sep. 18, 2003

(30) Foreign Application Priority Data

Feb. 20, 2002 (KR) .................. 10-2002-0009088

(51) Int. Cl.$^7$ .................. H01J 43/00; H01J 43/10
(52) U.S. Cl. .............. 313/103 R; 313/104; 313/105 R; 330/42
(58) Field of Search .............. 313/103 R, 103 CM, 313/105 R, 105 CM, 104, 532, 528, 377, 346 R; 330/42; 327/572–574

(56) References Cited

U.S. PATENT DOCUMENTS 4,825,118 A * 4/1989 Kyushima .................. 313/104
5,729,244 A * 3/1998 Lockwood .................. 345/75.2
6,346,775 B1 * 2/2002 Lee et al. .................. 315/169.3
2002/0167254 A1  11/2002 Craig et al.

FOREIGN PATENT DOCUMENTS

EP    1 122 759 A2   8/2001
EP    1 253 614 A1   10/2002

OTHER PUBLICATIONS

Yi, Whikun et al., "Microchannel plate for high–efficiency field emissions display," 77(11) Applied Physics Letters 1716–1718 (2000).
Frank, Stefan, "Carbon Nanotube Quantum Resistors," 280 SCIENCE 1744–1746 (1998).
Avouris, Ph., "Carbon nanotubes: nanomechanices, manipulation, and electronic devices," 141 Applied Surface Science 201–209 (1999).

* cited by examiner

Primary Examiner—Karabi Guharay
(74) Attorney, Agent, or Firm—Burns, Doane, Swecker & Mathis, L.L.P.

(57) ABSTRACT

An electron amplifier and a method of manufacturing the same are provided. The electron amplifier includes a substrate in which a plurality of through holes are formed, a resistive layer deposited on the sidewalls of the through holes, an electron emissive layer including carbon nanotubes which is deposited on the resistive layer, and an electrode layer formed on each of the upper and lower sides of the substrate. Because the electron emissive layer of the electron amplifier is uniform and provides a high electron emission efficiency, the electron amplification efficiency is improved. The electron amplifier manufacturing method enables economical mass production of electron amplifiers.

10 Claims, 8 Drawing Sheets

US 6,870,308 B2

ELECTRON AMPLIFIER UTILIZING CARBON NANOTUBES AND METHOD OF MANUFACTURING THE SAME

BACKGROUND OF THE INVENTION

This application claims priority from Korean Patent Application No. 2002-9088, filed on Feb. 20, 2002, in the Korean Intellectual Property Office, the disclosure of which is incorporated herein in its entirety by reference.

1. Field of the Invention

The present invention relates to an electron amplifier and a method of manufacturing the same, and more particularly, to an electron amplifier utilizing carbon nanotubes and a method of manufacturing the electron amplifier.

2. Description of the Related Art

Electron amplifiers include a secondary electron emission layer in order to induce emission of secondary electrons. Electron amplifiers are based on the principle that if primary electrons are accelerated to collide with the secondary electron emission layer, bound electrons on the surface of the secondary electron emission layer absorb the kinetic energy of the primary electrons, and are then emitted as secondary electrons.

Electron amplifiers are generally used in measuring equipment, such as, mass analyzers, surface analyzers, energy analyzers, and the like, and are also used in night goggles, display devices, and the like.

FIG. 1A is a cross-section of a conventional electron amplifier 10. Referring to FIG. 1A, the conventional electron amplifier 10 includes a substrate 13, electrode layers 14 and 15 formed on the upper and lower surfaces of the substrate 13, respectively, a through hole 11 formed perpendicular to the electron layers 14 and 15, a resistive layer 16 formed along the inner wall of the through hole 11, and an electron emission layer 17 formed covering the resistive layer 16.

FIG. 1B illustrates a method of manufacturing a conventional electron amplifier. As shown in step (a), a core glass 22 which melts in a chemical etching solution and a lead glass 21 which does not melt in the chemical etching solution are prepared. As shown in step (b), the core glass 22 fits into the lead glass 21 to obtain a single glass pipe 23. Thereafter, the single glass pipe 23 is stretched to obtain a thin glass fiber 23' as shown in step (c). Then, glass fibers 23' are tied into a hexagonal bundle 24 as shown in step (d). Next, the hexagonal bundle is stretched out to obtain a thin hexagonal multiple fiber 25 as shown in step (e). Next, hexagonal multiple fibers 25 are tied into a bundle 26, and the bundle 26 is then attached to a glass skin to be shaped as shown in step (f). The bundle 26 is then thinly cut to obtain a wafer 27 as shown in step (g).

Next, the surface of the wafer 27 is polished, and the core glass 22 of the glass fiber 23' is etched using an appropriate etching solution to produce a structure 28 as shown at step (h). Then, the resultant wafer 27 undergoes a chemical process for increasing the secondary electron emission property of the wall of the glass fiber 23' and is then reduced in a hydrogen-ambient baking furnace to produce a structure 29 as shown in step (i). During this reduction, lead oxide on the glass surface turns into conductive lead and water, and lead particles form lumps. If the temperature is high, lead particle lumping prevails over new lead particle formation. Thus, the resistance between two electrodes is not determined by lead particles but by the temperature in the baking furnace.

Finally, an electrode is formed of Inconel or Nichrome on the baked wafer 27 as shown at step (j), thereby completing a microchannel plate having a structure 30.

The electrical operation characteristics of electron amplifiers are usually determined by their resistance, which in turn is determined by the ratio of the length of a through hole to the diameter thereof. Accordingly, it is difficult for conventional electron amplifiers to obtain a desired electron emission efficiency, for example, an electron emission efficiency of $10^3$ through $10^5$ times as much as a primary electron emission efficiency.

SUMMARY OF THE INVENTION

The present invention provides an electron amplifier with an excellent secondary electron emission property, and a method of simply manufacturing an electron amplifier, by which large display device screens can be easily manufactured.

According to an aspect of the present invention, there is provided an electron amplifier including a substrate in which a plurality of through holes are formed, a resistive layer deposited on the sidewalls of the through holes, an electron emissive layer deposited on the resistive layer and including carbon nanotubes, and an electrode layer formed on each of the upper and lower sides of the substrate.

According to another aspect of the present invention, there is provided a method of manufacturing an electron amplifier. In the method, first, through holes are formed in a substrate. Next, a resistive layer is formed on the sidewalls of the through holes. Thereafter, carbon nanotubes are added to a sol-gel solution of a material with a high secondary electron emission coefficient. Then, an electron emissive layer is deposited on the resistive layer by dipping the substrate having the through holes and the resistive layer into the sol-gel solution. Then, the substrate on which the through holes, the resistive layer, and the electron emission layer are formed is baked. An electrode layer is then formed on each of the upper and lower sides of the substrate so as to be perpendicular to the through holes.

Preferably, the electron emissive layer is formed of any of oxide-based and fluoride-based materials having a high secondary electron emission coefficient.

It is also preferable that the oxide-based material is one of $MgO$, $SiO_2$, and $La_2O_3$, and the fluoride-based material is one of $CaF_2$ and $MgF_2$.

Preferably, the substrate is formed of any material selected from the group consisting of any glass, any ceramic, $Al_2O_3$, Cu, and Si.

In the electron amplifier according to the present invention, a secondary electron emission film is formed by mixing carbon nanotubes with a material having a high secondary electron emission efficiency. Thus, the electron amplifier provides a high secondary electron emission efficiency. Also, because the electron amplifier is simply manufactured using a sol-gel method, large display device screens can be economically mass-produced.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1A:
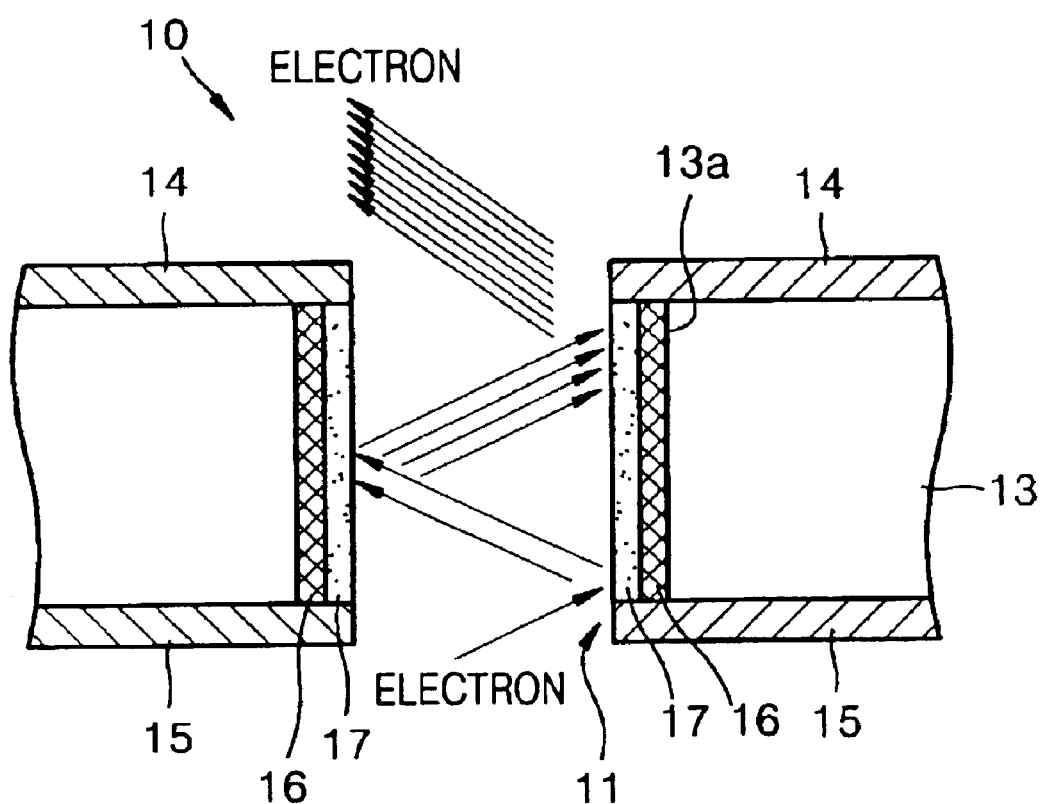
FIG. 1A is a cross-section of a conventional electron amplifier.
Figure 1B:
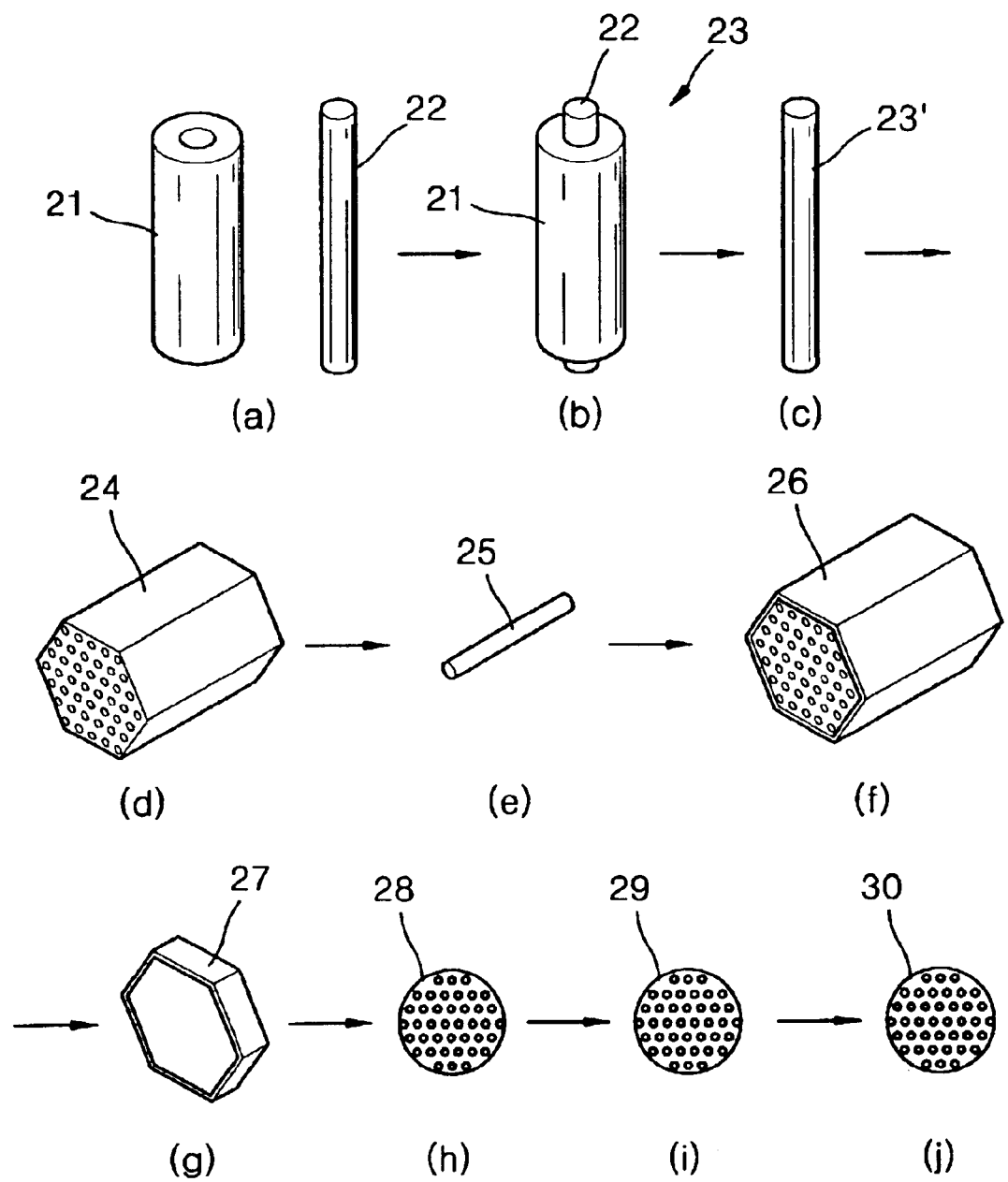
FIG. 1B illustrates a method of manufacturing a conventional electron amplifier.

The present invention will now be described more fully with reference to the accompanying drawings, in which preferred embodiments of the invention are shown. Throughout the drawings, the same reference numerals denote the same members.

Figure 2:
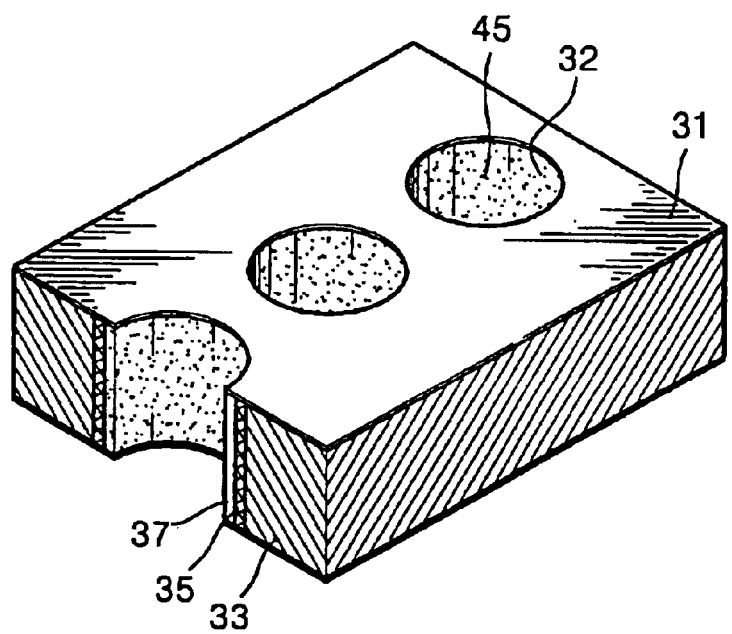
FIG. 2 is a perspective view of an electron amplifier according to an embodiment of the present invention.

Referring to FIG. 2, an electron amplifier according to an embodiment of the present invention includes a substrate 33, a plurality of through holes 32 formed in the substrate 33, a resistive layer 35 formed along the inner wall of each of the through holes 32, an electron emission layer 37 deposited on the resistive layer 35 and including carbon nanotubes 45, and upper and lower electrode layers 31 formed on the upper and lower sides of the substrate 33, respectively, so as to be perpendicular to the through holes 32.

The substrate 33 is formed of glass, ceramic such as $Al_2O_3$, or metal such as Cu or Si.

The resistive layer 35 is formed of metal oxide with sufficient resistance to prevent an electrical short-circuit of the upper and lower electrode layers 31, and allow electrons to be adequately supplied to the electron emission layer 37 against voltage received from a power source.

The electron emission layer 37 is formed of the carbon nanotubes 45 together with an oxide-based or fluoride-based material having high secondary electron emission efficiency. A secondary electron emission coefficient denotes a ratio of the number of incident primary electrons to the number of emitted secondary electrons.

The carbon nanotube 45, a nano-sized graphite surface rolled into a cylindrical shape, is known to have unique physical properties depending on its shape and size. Frank reported in 1998 that, according to a scanning probing microscopy (SPM) measurement of the conductivity of a carbon nano fiber dipped in a liquid, carbon nanotubes exhibit quantum behaviour and have remarkably high conductivity. Carbon nanotubes have been observed to provide a stable current density of $10^7 A/cm^2$ or greater by Frank et al. and a stable current density of $10^{13} A/cm^2$ or greater by Avoris et al.

Because of the excellent electrical characteristics of carbon nanotubes, the manufacture of display devices, electron guns, lithium batteries, and transistors, using the electron emission property of carbon nanotubes, has been actively studied of late.

The carbon nanotubes 45 used in an electron amplifier according to the present invention can be manufactured using an arc discharge method, a laser vaporization method, a plasma enhanced chemical vapor deposition (PECVD) method, a thermal chemical vapor deposition (TCVD) method, or a vapor phase growth method.

Among materials with a high secondary electron emission coefficient to form the electron emission layer 37, examples of an oxide-like material include MgO, $SiO_2$, and $La_2O_3$, and examples of a fluoride-like material include $MgF_2$ and $CaF_2$.

The electron of atoms making up the surface of the electron emission layer 37 absorbs the kinetic energy of a primary electron, which is emitted from an external source, when the primary electron collides with the surface of the electron emission layer 37, and is then emitted from the surface of the electron emission layer 37 against a Coulomb attraction. Because the electron is emitted by the kinetic energy of the primary electron, the emitted outermost electron is called a secondary electron. As the secondary electron emission coefficient of the electron emission layer 37 increases, more secondary electrons are emitted. The number of secondary electrons emitted can be calculated from measured current because current depends on a consecutive flow of secondary electrons.

Figure 3A:
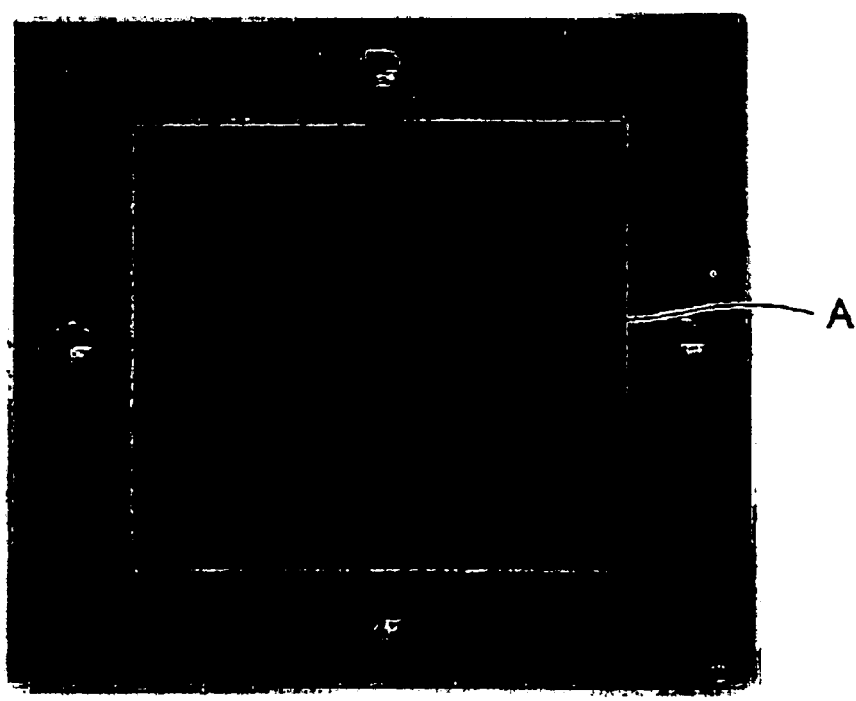
FIG. 3A is a plan view of an electron amplifier according to an embodiment of the present invention.
Figure 3B:
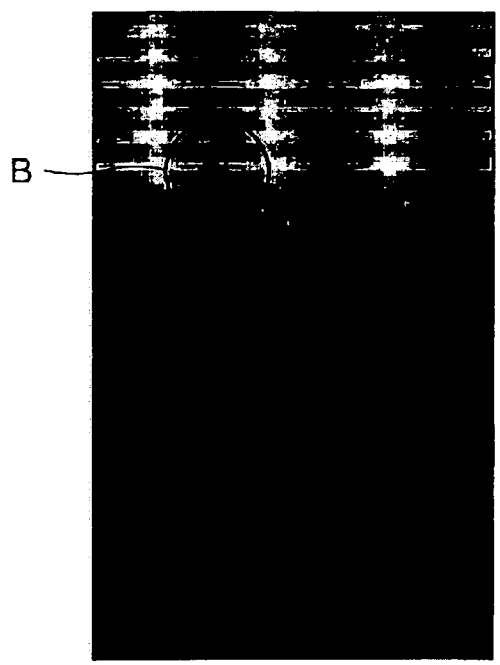
FIG. 3B is a magnified view of circle A of FIG. 3A.
Figure 3C:
FIG. 3C is a magnified view of circle B of FIG. 3B.

FIGS. 3A through 3C are pictures of an electron amplifier according to an embodiment of the present invention. FIG. 3A shows the top surface of the electron amplifier according to an embodiment of the present invention. FIG. 3B is a magnified picture of circle A of FIG. 3A. FIG. 3C is a magnified picture of circle B of FIG. 3B. In FIG. 3C, reference numeral 33 denotes a substrate made of alumina $Al_2O_3$, reference numeral 35 denotes a resistive layer made of $CuAl_2O_4$, and reference numeral 37 denotes an electron emissive layer made of $SiO_2$ or MgO.

Figure 4A:
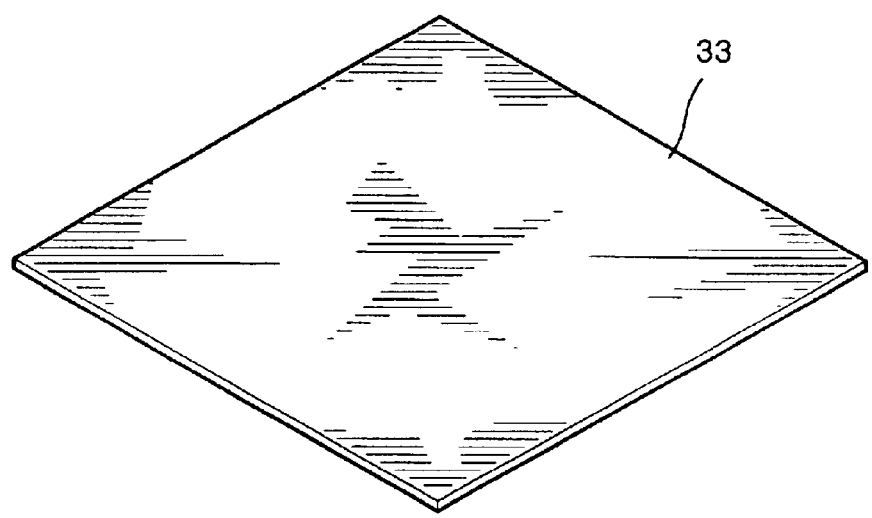
FIGS. 4A through 4E illustrate steps before an electron emission film deposition step in a method of manufacturing an electron amplifier according to an embodiment of the present invention.
Figure 4B:
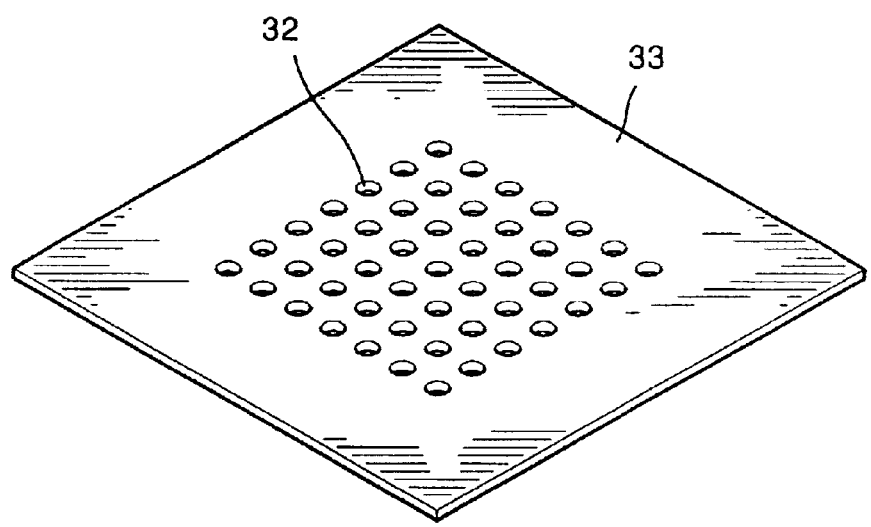

FIGS. 4A through 4E and 5 illustrate a method of manufacturing an electron amplifier according to an embodiment of the present invention. First, as shown in FIG. 4A, a substrate 33 is formed of an alumina paste and then dried. The dried alumina substrate 33 is soft enough to easily form through holes 32 as shown in FIG. 4B.

Figure 4C:
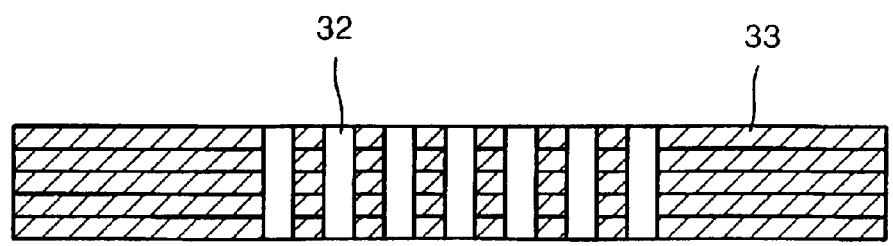
Figure 4D:
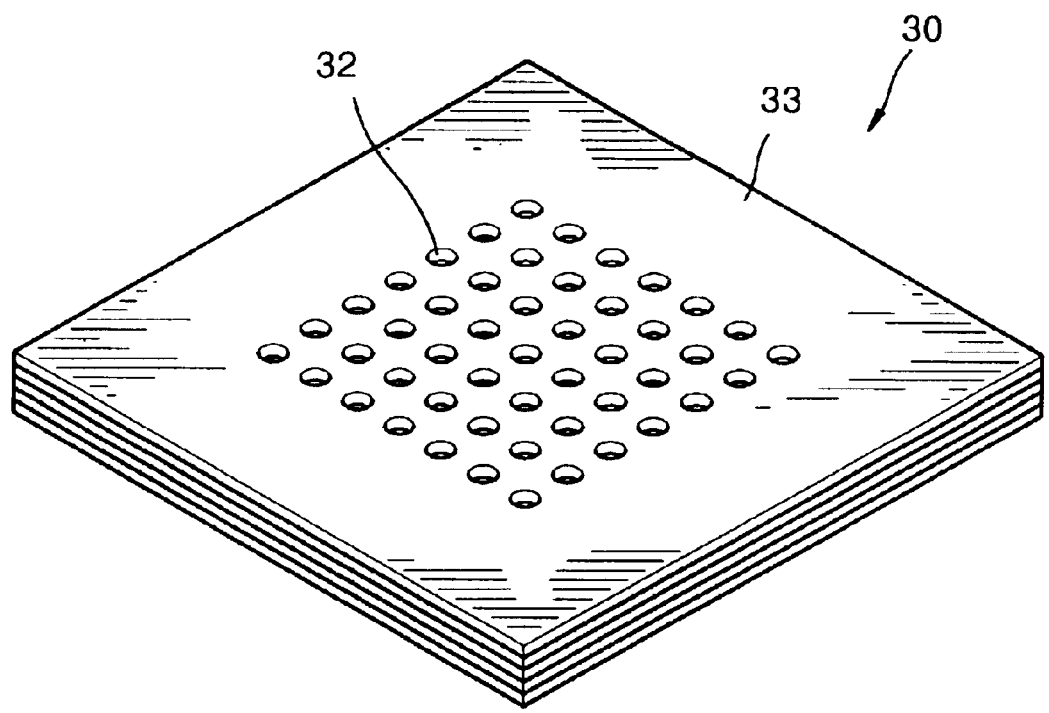

Next, the substrate 33 with the through holes 32 is compressed into a thin plate, and a plurality of thin substrates 33 are piled on top of one another as shown in FIG. 4C. Thereafter, the piled substrates 33 are baked to form a basic structure 30 of an electron amplifier as shown in FIG. 4D.

Then, Cu or Ni is deposited on the basic structure 30 using electron beams, a sputtering (deposition) method, or a plating method, and then baked. Accordingly, $CuAl_2O_4$, CuO, or $NiAl_2O_4$ flows along the inner walls of the through holes 32, thereby forming resistive layers 35 as shown in FIG. 4E.

Figure 4E:
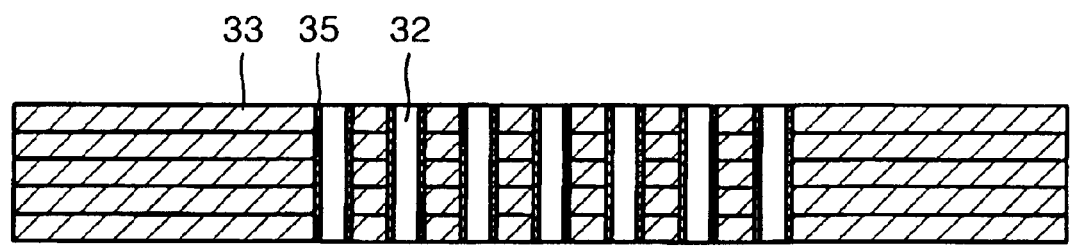
Figure 5:
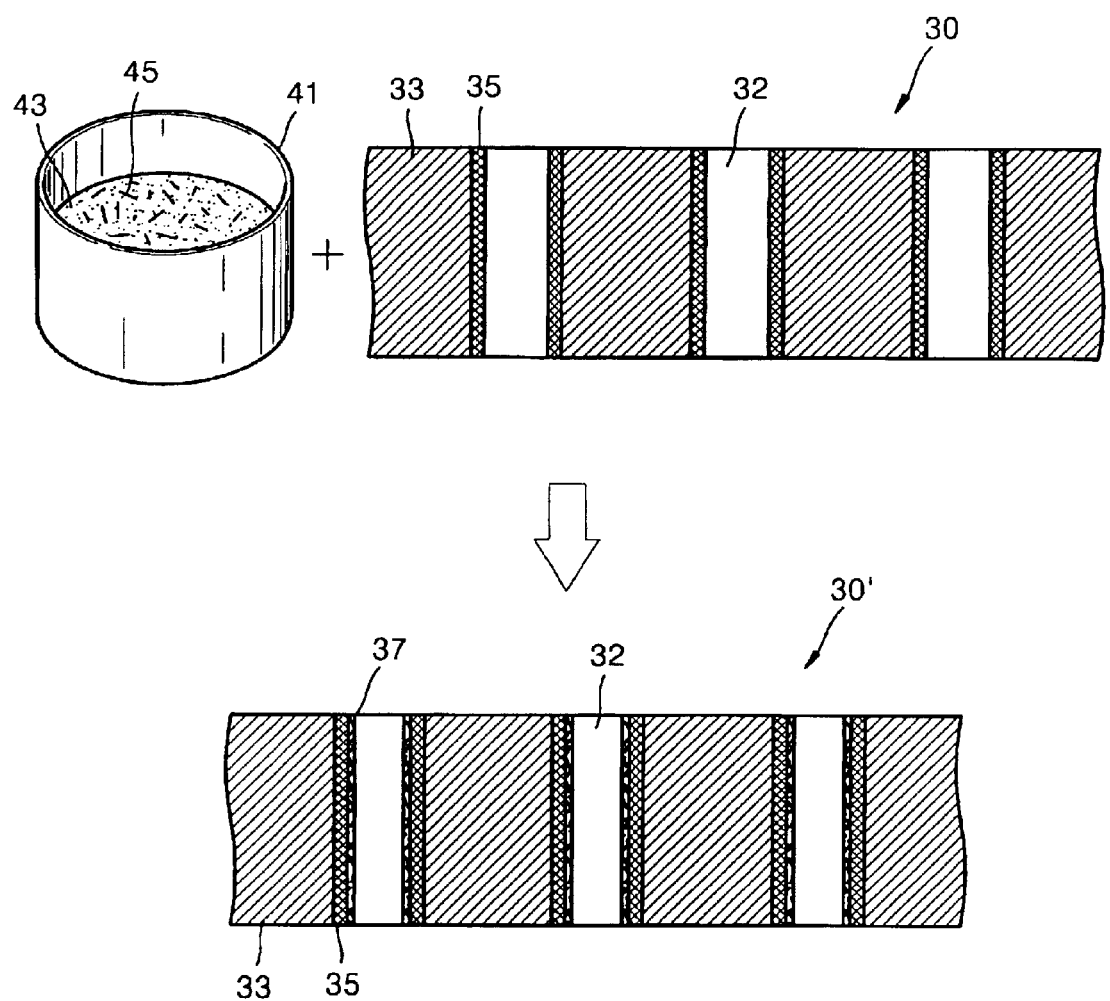
FIG. 5 illustrates the electron emission film deposition step in the method of manufacturing the electron amplifier according to an embodiment of the present invention.

FIG. 5 illustrates a process of forming an electron emissive film on the basic structure 30 completed through the steps of FIGS. 4A through 4E. Referring to FIG. 5, a sol-gel solution of materials with an excellent secondary electron emission property, for example, a $SiO_2$ or MgO sol-gel solution 43, is stored in a vessel 41, and the carbon nanotubes 45 are dispersed in the sol-gel solution 43. The basic structure 30 completed in FIG. 4E is dipped in the sol-gel solution 43 and then baked for a short period of time at a low temperature. Accordingly, an electron emissive layer 37 including the carbon nanotubes 45 is formed along the surface of the resistive layer 35, thereby completing the fabrication of an electron amplifier 30' according to an embodiment of the present invention as shown in FIG. 2.

Figure 6:
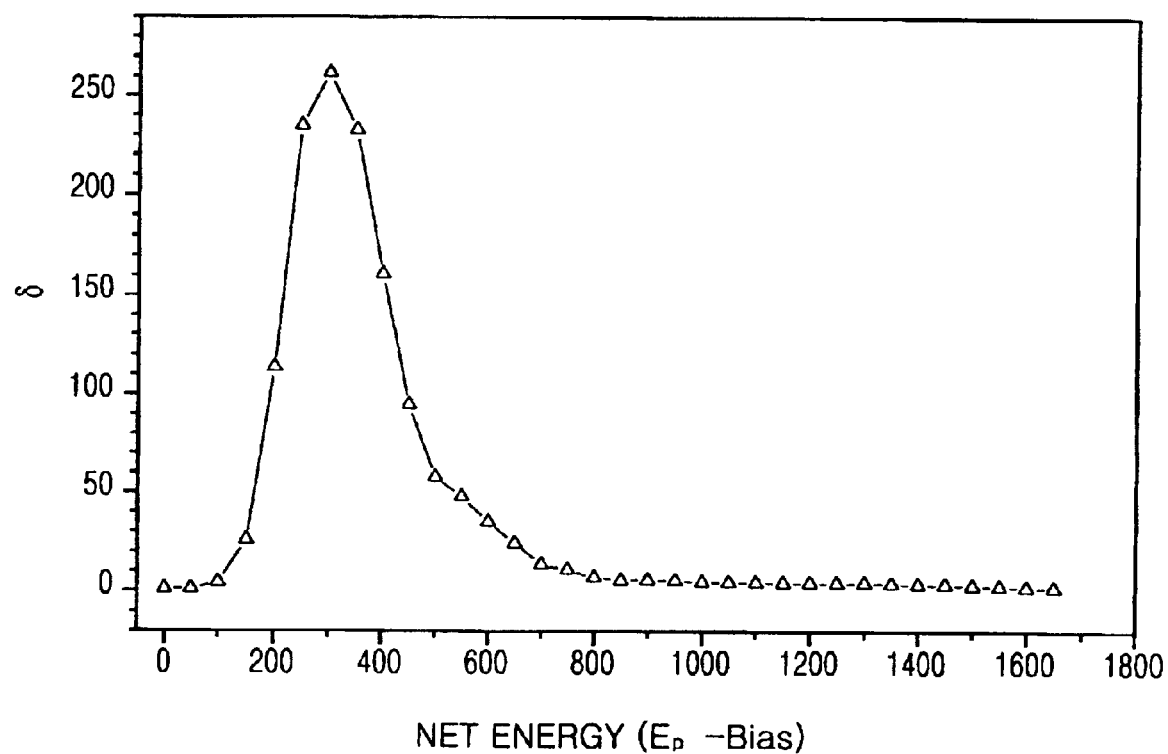
FIG. 6 is a graph of secondary electron emission efficiency ($\delta$) versus net energy of primary electrons of a secondary electron emission film installed in an electron amplifier according to an embodiment of the present invention.

FIG. 6 is a graph showing the emission characteristics of a secondary electron emissive film including carbon nanotubes used in an electron amplifier according to an embodiment of the present invention. Carbon nanotubes of 0.015 g were dispersed in a solution mixed with 1,3-propanediol ($C_3H_8O_2$), MgO acetate ($MG(CH_3CO_2)_2+4H_2O$), and MgO to obtain an 0.65M MgO solution. Then, a secondary electron emissive film was coated on a silicon substrate using the above-described manufacturing method. The graph of FIG. 6 shows secondary electron emission efficiency ($\delta$) versus the net energy of the primary electrons, that is, energy corresponding to the difference between a primary electron energy (Ep) and a bias potential. Here, the secondary electron emission efficiency ($\delta$) represents how many secondary electrons are emitted when primary electrons collide with the silicon substrate on which the secondary electron emissive film is formed.

The secondary electron emission efficiency ($\delta$) denotes a ratio of secondary electron current with respect to primary electron current. As shown in FIG. 6, when the net energy is 300 (eV), the highest secondary electron emission efficiency ($\delta$) is provided. Accordingly, the net energy at which the secondary electron emission efficiency is the highest, as in the above experiment, is used to provide a highly efficient electron amplifier.

The electron amplifier according to an embodiment of the present invention can be simply manufactured at a low cost using the manufacturing method using a sol-gel solution. Also, a pure, uniform electron emissive layer can be obtained at a low temperature. Thus, the electron amplifier is suitable for large display device screens. In particular, because the electron emissive layer is formed by adding carbon nanotubes to a material with an excellent secondary electron emission property, the electron emissive layer provides a significantly higher secondary electron emission efficiency than existing electron emissive layers.

Because of these improved electron emission characteristics, a desired secondary electron emission efficiency can be obtained without having to increase the primary electron current or adjust the dimensions of the through holes. Thus, a limit in the ratio of the length of a through hole to the diameter thereof is overcome, which facilitates more control over an electrical performance in the manufacture of an electron amplifier.

While the present invention has been particularly shown and described with reference to exemplary embodiments thereof, it will be understood by those of ordinary skill in the art that various changes in form and details may be made therein without departing from the spirit and scope of the present invention as defined by the following claims. For example, other materials with an excellent secondary electron emission efficiency, not mentioned herein, can be used to fabricate an electron amplifier according to the present invention.

What is claimed is:

1. An electron amplifier comprising:
   a substrate in which a plurality of through holes are formed;
   a resistive layer deposited on the sidewalls of the through holes;
   a homoaeneous electron emissive layer deposited on the resistive layer and including carbon nanotubes; and
   an electrode layer formed on each of the upper and lower sides of the substrate.

2. The electron amplifier of claim 1, wherein the electron emissive layer is formed of any of oxide-based and fluoride-based materials having a high secondary electron emission coefficient.

3. The electron amplifier of claim 2, wherein the oxide-based material is one of MgO, $SiO_2$, and $La_2O_3$.

4. The electron amplifier of claim 2, wherein the fluoride-based material is one of $CaF_2$ and $MgF_2$.

5. The electron amplifier of claim 1, wherein the substrate is formed of any material selected from the group consisting of any glass, any ceramic, $Al_2O_3$, Cu, and Si.

6. An electron amplifier comprising:
   a substrate in which a plurality of through holes are formed;
   a resistive layer deposited on the sidewalls of the through holes;
   an electron emissive layer deposited on the resistive layer and including an admixture of a material having a high secondary emission coefficient and carbon nanotubes; and
   an electrode layer formed on each of the upper and lower sides of the substrate.

7. The electron amplifier of claim 6, wherein the electron emissive layer is formed of any of oxide-based and fluoride-based materials having a high secondary electron emission coefficient.

8. The electron amplifier of claim 7, wherein the oxide-based material is one of MgO, $SiO_2$, and $La_2O_3$.

9. The electron amplifier of claim 7, wherein the fluoride-based material is one of $CaF_2$ and $MgF_2$.

10. The electron amplifier of claim 7, wherein the substrate is formed of any material selected from the group consisting of any glass, any ceramic, $Al_2O_3$, Cu, and Si.

* * * * *